May 25, 1943.  R. V. SANDSTROM  2,319,886
METHOD AND COMPOSITION FOR PRODUCING A CRYSTALLINE COATING
Filed June 6, 1938
INVENTOR
ROBERT V. SANDSTROM
BY
ATTORNEYS Patented May 25, 1943

2,319,886

UNITED STATES PATENT OFFICE 2,319,886

METHOD AND COMPOSITION FOR PRODUCING CRYSTALLINE COATINGS

Robert V. Sandstrom, Detroit, Mich.

Application June 6, 1938, Serial No. 212,100

10 Claims. (Cl. 117—42)

The invention relates to a coating composition, and more particularly to a paint or other coating composition which when applied to a surface imparts a crystal, frost-like, or wrinkle finish.

One of the objects of the invention is to obtain a suitable composition which will not only provide a protective coating, but also will provide an appearance which is different from the ordinary type of coatings.

Another object of the invention is to obtain a composition having incorporated therein certain crystalline materials together with certain other ingredients in such proportions that the film when drying will take on the unusual appearance due to the crystallizing of the crystalline material aforesaid prior to the final setting of the film.

In the preferred form of my invention, the composition has as its base material a polymerized rubber resin, or a modified rubber resin. This may, in some instances, include pigments therein, or the pigments may be separately added. The composition also contains both mineral spirits and aromatic solvents which are incorporated in certain ratios as hereinafter more fully pointed out.

The crystalline material used in the composition may be described generally as any high molecular weight oil-soluble crystalline substance not soluble, or only slightly soluble, in the rubber resin base. In the preferred form the crystalline material is not water-soluble and only slightly soluble in aliphatic solvents, such as mineral spirits, but completely soluble, or substantially completely soluble, in aromatic solvents. The solvents in the composition are present in such ratios that the drying time of the mineral spirits is longer than that of the aromatic solvents so that the crystalline material, which is originally dissolved in the aromatic solvents, is caused to crystallize out before the mineral spirits are entirely eliminated from the drying film.

As examples of crystalline materials coming within the purview of my invention, the following are specifically listed, although the invention in its broader aspects covers other compounds having equivalent properties as indicated above:

Cyclohexyl para-toluene sulfonamide
Phthalic anhydrid
Paradichlorobenzene
Butadiene tetrachloride In addition to the crystalline material of the class above described, it is desirable in the composition to include also a material which will act to form seed crystals so that in the drying of the film, when the solution of the crystalline material becomes saturated or super-saturated, the seed crystals will function to cause a crystallization in the protective coating. An appropriate material for forming the seed crystals is naphthalene. It is not, however, necessary to have the additional material to form said crystals as crystallization will take place even in the absence of such material.

As an example of one composition which produces the novel films of my invention, the following formula is given:

Example 1

|   | Pounds |
|---|---|
| Rubber resin | 100 |
| Toluene | 400 |
| Mineral spirits | 100 |
| Cyclohexyl para-toluene sulfonamide | 50 |
| Naphthalene | 20 |
| Tung oil | 5 |
| Aluminum or gold bronze | 50 |

Another example is as follows:

Example 2

|   | Pounds |
|---|---|
| Rubber resin | 100 |
| Pigment | 30 to 200 |
| Mineral spirits | 200 |
| Toluol | 400 |
| Crystalline material | 25 to 100 |
| Naphthalene | 10 |
| Tung oil | 5 |

A further example is as follows:

Example 3

|   | Pounds |
|---|---|
| Pliolite base No. 2 | 65 |
| Pliolite base No. 17 | 65 |
| Xylol | 200 |
| Sunoco spirits | 100 |
| Naphtha | 200 |
| Raw tung oil | 5 |
| Naphthalene | 25 |
| Cyclohexyl para-toluene sulfonamide | 65 |

The above examples are given to illustrate the nature of the composition of my invention, but it is to be understood that various modifications of the composition may be made. As previously stated, the novel appearance is produced largely because of the limited solubility of the crystalline material in the mineral spirits, and it is therefore essential that the ratio between the aliphatic and aromatic solvents be such that in the drying process the mineral spirits will be retained longer in the composition than the aromatic solvents. Preferably, the ratio between the aliphatic solvent and the aromatic solvent is such that the aliphatic solvent will be present in proportions of 15% to 50% of the combined solvents.

As illustrative of the base materials for the paint, the rubber resin may be what is termed a polymerized rubber resin, or it may be a modified rubber resin (to which pigments are later added). A rubber resin as used herein is a rubber condensation derivative. The condensation may be brought about by tin tetrachloride or hydrated chlorostannic acid as described in United States Patent No. 2,052,391. Therefore the base material may be described generically as the reaction product of rubber with a reagent from the group consisting of chlorostannic acid and a halide of an amphoteric metal. Such materials are known in the art, and as a specific example I refer to Pliolite base which is made by Goodyear Tire & Rubber Company and is a Pliolite resin into which pigment has been milled on a rubber mill to thoroughly disperse the pigment in the Pliolite resin. Another specific example is Reanite which is a material produced by milling acid aluminum sulfate into rubber with the addition of a small amount of water. The resultant is heated 5 to 6 hours at 300° F. While still hot, it is milled and washed with water. When dry, this product is satisfactory for use as a base for coating materials.

Pigments may be added to the composition as is well understood in the art, both to obtain the desired color and also to act as fillers. Such materials as titanium oxide, carbon black, Prussian blue, silica, extenders, clays, chrome green, chrome orange, aluminum powder, etc., are examples of pigments but many others may be incorporated if desired.

The term mineral spirits as used in the specification refers to aliphatic solvents as distinguished from coal tar or aromatic solvents. Many commercial forms of mineral spirits are obtainable. The term aromatic solvent is used to include such materials as toluol, xylol, benzol, high-flash naphthas, etc., as is well understood in the art.

The compositions of my invention are adapted for air drying as distinguished from baking. During the drying process, the crystallization occurs, as previously referred to, before the film is entirely dried and the pattern of the finish may be controlled to a certain extent by the amount of mineral spirits left in the film after crystallization starts. The quicker the evaporation takes place, the smaller the pattern will be, and conversely, the slower the evaporation, the larger the pattern. It has been found that compositions which dry in about ten minutes' time are very satisfactory. After the crystallization takes place, the film may be forced-dried if found desirable.

The composition may be applied to metallic or non-metallic materials. It may be applied with a brush, spray gun, roll coated, dipped, or any other suitable way. It protects the surface to which it is applied, and also gives the frost-like, or crystalline, appearance previously referred to which is ornamental and unique.

In the drawing the figure shows the distinctive appearance of the coating of my invention. The drawing is somewhat exaggerated because it shows more contrast than is normally present in the coating as ordinarily used. It should also be noted that the size of the crystals are subject to variation as previously mentioned, thus causing a larger or smaller pattern as desired.

What I claim as my invention is:

1. A coating composition comprising the reaction product of rubber with a reagent from the group consisting of chlorostannic acid and a halide of an amphoteric metal, an aliphatic solvent, an aromatic solvent, and a high molecular weight crystalline material soluble in mixtures of aromatic and aliphatic solvents and not more than slightly soluble in said rubber reaction product and in the aliphatic solvent, the ratio of the aliphatic solvents to the aromatic solvents being such that the drying time of the aliphatic solvents is longer than that of the aromatic solvents.

2. A coating composition comprising the reaction product of rubber with a reagent from the group consisting of chlorostannic acid and a halide of an amphoteric metal, an aliphatic solvent, an aromatic solvent, and cyclohexyl para-toluene sulfonamide, the ratio of the aliphatic solvents to the aromatic solvents being such that the drying time of the aliphatic solvents is longer than that of the aromatic solvents.

3. A coating composition comprising the reaction product of rubber with a reagent from the group consisting of chlorostannic acid and a halide of an amphoteric metal, an aromatic solvent, an aliphatic solvent, a coloring pigment, a plasticizer, cyclohexyl para-toluene sulfonamide and naphthalene.

4. A coating composition comprising the reaction product of rubber with a reagent from the group consisting of chlorostannic acid and a halide of an amphoteric metal, an aromatic solvent, an aliphatic solvent and cyclohexyl para-toluene sulfonamide.

5. A coating composition comprising the reaction product of rubber with a reagent from the group consisting of chlorostannic acid and a halide of an amphoteric metal, cyclohexyl para-toluene sulfonamide, an aromatic solvent and sufficient aliphatic solvent to render its drying time longer than said aromatic solvent.

6. A process which comprises mixing the reaction product of rubber with a reagent from the group consisting of chlorostannic acid and a halide of an amphoteric metal, cyclohexyl para-toluene sulfonamide, an aromatic solvent, and sufficient aliphatic solvent to render its drying time longer than said aromatic solvent, applying said mixture to a surface, and evaporating said solvents whereby said cyclohexyl para-toluene sulfonamide is crystallized prior to the complete evaporation of said aliphatic solvent.

7. A process which comprises mixing the reaction product of rubber with a reagent from the group consisting of chlorostannic acid and a halide of an amphoteric metal, an aromatic solvent, an aliphatic solvent in amount sufficient to render its drying time longer than said aromatic solvent, and a high molecular weight crystalline substance soluble in mixtures of aromatic and aliphatic solvents and not more than slightly soluble in said rubber reaction product and in the aliphatic solvent, applying said mixture to a surface, and evaporating said solvents whereby said crystalline material is crystallized prior to the complete evaporation of said aliphatic solvent.

8. A process which comprises mixing the reaction product of rubber with a reagent from the group consisting of chlorostannic acid and a halide of an amphoteric metal, toluol, mineral spirits and cyclohexyl para-toluene sulfonamide, the amount of said mineral spirits being sufficient to render its drying time longer than said toluol, applying said mixture to a surface, and evaporating said solvents whereby said cyclohexyl para-toluene sulfonamide is crystallized prior to the complete evaporation of said mineral spirits.

9. A coating composition comprising the reaction product of rubber with a reagent from the group consisting of chlorostannic acid and a halide of an amphoteric metal, an aromatic solvent, an aliphatic solvent, and a high molecular weight crystalline substance soluble in mixtures of aromatic and aliphatic solvents and not more than slightly soluble in said rubber reaction product and in said aliphatic solvent.

10. A coating composition comprising the reaction product of rubber with a reagent from the group consisting of chlorostannic acid and a halide of an amphoteric metal, toluol, mineral spirits, and cyclohexyl para-toluene sulfonamide the ratio of the mineral spirits to the toluol being such that the drying time of the mineral spirits is longer than that of the toluol.

ROBERT V. SANDSTROM.